US011317064B2

United States Patent
Yeoh et al.

(10) Patent No.: US 11,317,064 B2
(45) Date of Patent: *Apr. 26, 2022

(54) POLARIZING MAINTAINING OPTICAL FIBER IN VIRTUAL/AUGMENTED REALITY SYSTEM

(71) Applicant: Magic Leap, Inc., Plantation, FL (US)

(72) Inventors: Ivan Yeoh, Tampa, FL (US); Lionel Ernest Edwin, Plantation, FL (US); David Tinch, Laramie, WY (US)

(73) Assignee: Magic Leap, Inc., Plantation, FL (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/737,789

(22) Filed: Jan. 8, 2020

(65) Prior Publication Data
US 2020/0145625 A1    May 7, 2020

Related U.S. Application Data

(63) Continuation of application No. 15/410,456, filed on Jan. 19, 2017, now Pat. No. 10,587,848.

(60) Provisional application No. 62/280,992, filed on Jan. 20, 2016.

(51) Int. Cl.
  *G02B 6/26*    (2006.01)
  *G02B 6/32*    (2006.01)
  (Continued)

(52) U.S. Cl.
  CPC ......... *H04N 9/3129* (2013.01); *G02B 26/103* (2013.01); *G02B 27/0172* (2013.01);
  (Continued)

(58) Field of Classification Search
  CPC ....... G06T 19/20; G06T 19/006; G06T 13/20; G06T 15/005; G02B 27/0172;
  (Continued)

(56) References Cited

U.S. PATENT DOCUMENTS 1,679,086 A    7/1928   Jenkins
4,274,854 A    6/1981   Pleibel et al.
            (Continued)

FOREIGN PATENT DOCUMENTS

AU    2016333970    10/2016
CN    103105634    5/2013
            (Continued)

OTHER PUBLICATIONS

Notice of Acceptance dated Dec. 16, 2019 for Australian Application No. 2015210708.

(Continued)

*Primary Examiner* — Kaveh C Kianni
*Assistant Examiner* — Hung Q Lam
(74) *Attorney, Agent, or Firm* — Vista IP Law Group, LLP

(57) ABSTRACT

A display subsystem for a virtual image generation system for use by an end user comprises a display, an optical fiber having a polarization-maintaining (PM) transmission fiber section and a non-PM scanning fiber section, a light source configured for injecting a linearly polarized light beam into the transmission fiber section, such that the linearly polarized light beam is emitted from the scanning fiber section, a mechanical scanning drive assembly in which the scanning fiber section is affixed, wherein the mechanical scanning drive assembly is configured for displacing the scanning optical fiber section is order to scan the emitted light beam, and a display configured for receiving the scanned light beam and generating an image to the end user.

17 Claims, 11 Drawing Sheets

(51) Int. Cl.

| | | |
|---|---|---|
| *G02B 6/34* | (2006.01) | |
| *G02B 6/30* | (2006.01) | |
| *G02B 6/42* | (2006.01) | |
| *G02B 6/10* | (2006.01) | |
| *H04N 9/31* | (2006.01) | |
| *H04N 13/337* | (2018.01) | |
| *H04N 13/383* | (2018.01) | |
| *H04N 13/366* | (2018.01) | |
| *H04N 13/344* | (2018.01) | |
| *H04N 13/363* | (2018.01) | |
| *G02B 27/01* | (2006.01) | |
| *G02B 26/10* | (2006.01) | |
| *G06T 19/00* | (2011.01) | |
| *F21V 8/00* | (2006.01) | |
| *G02B 6/024* | (2006.01) | |

(52) U.S. Cl.
CPC ......... *G06T 19/006* (2013.01); *H04N 13/337* (2018.05); *H04N 13/344* (2018.05); *H04N 13/363* (2018.05); *H04N 13/366* (2018.05); *H04N 13/383* (2018.05); *G02B 6/0008* (2013.01); *G02B 6/0011* (2013.01); *G02B 6/024* (2013.01); *G02B 2027/0178* (2013.01)

(58) Field of Classification Search
CPC ................ G02B 6/0026; G02B 27/017; G02B 27/0174; G02B 6/0031; G02B 6/0076; G02B 6/0015; G02B 6/0028
USPC ................... 385/25, 34–37, 49, 50, 129–132
See application file for complete search history.

(56) References Cited

U.S. PATENT DOCUMENTS

| | | |
|---|---|---|
| 4,472,737 A | 9/1984 | Iwasaki |
| 4,832,464 A | 5/1989 | Kato et al. |
| 4,955,687 A | 9/1990 | Pafford |
| 5,033,814 A | 7/1991 | Brown et al. |
| 5,729,242 A | 3/1998 | Margerum et al. |
| 5,764,317 A | 6/1998 | Sadovnik et al. |
| 5,949,941 A | 9/1999 | DiGiovanni |
| 6,046,720 A | 4/2000 | Melville et al. |
| 6,069,650 A | 5/2000 | Battersby |
| 6,294,775 B1 | 9/2001 | Siebel |
| 6,385,358 B1 | 5/2002 | Everett et al. |
| 6,504,629 B1 | 1/2003 | Popovich et al. |
| 6,643,065 B1 | 11/2003 | Silberman |
| 6,845,190 B1 | 1/2005 | Smithwick et al. |
| 6,959,130 B2 | 10/2005 | Fauver et al. |
| 7,189,961 B2 | 3/2007 | Johnston et al. |
| 7,555,333 B2 | 6/2009 | Wang et al. |
| 7,608,842 B2 | 10/2009 | Johnston |
| 7,784,697 B2 | 8/2010 | Johnston et al. |
| 8,248,458 B2 | 8/2012 | Schowengerdt et al. |
| 8,372,004 B2 | 2/2013 | Krattiger |
| 8,467,133 B2 | 6/2013 | Miller |
| 8,469,525 B2 | 6/2013 | Kojima et al. |
| 8,472,120 B2 | 6/2013 | Border et al. |
| 8,757,812 B2 | 6/2014 | Melville et al. |
| 9,014,517 B2 | 4/2015 | Katakura et al. |
| 9,310,559 B2 | 4/2016 | Macnamara |
| 9,389,424 B1 | 7/2016 | Schowengerdt |
| 9,417,452 B2 | 8/2016 | Schowengerdt et al. |
| 9,457,412 B2 | 8/2016 | Schowengerdt et al. |
| 9,612,403 B2 | 4/2017 | Abovitz et al. |
| 9,671,566 B2 | 6/2017 | Abovitz et al. |
| 10,254,536 B2 | 4/2019 | Yeoh et al. |
| 10,317,690 B2 | 6/2019 | Cheng |
| 10,338,391 B2 | 7/2019 | Yeoh et al. |
| 10,386,636 B2 | 8/2019 | Welch |
| 10,848,740 B2 | 11/2020 | Li et al. |
| 2001/0013960 A1 | 8/2001 | Popovich et al. |
| 2002/0110077 A1 | 8/2002 | Drobot et al. |
| 2003/0020879 A1 | 1/2003 | Sonehara |
| 2003/0169405 A1 | 9/2003 | Agostinelli et al. |
| 2004/0151466 A1 | 8/2004 | Crossman-Bosworth et al. |
| 2004/0179764 A1 | 9/2004 | Melikechi et al. |
| 2004/0258341 A1 | 12/2004 | Paolucci et al. |
| 2005/0173817 A1 | 8/2005 | Fauver et al. |
| 2005/0213103 A1 | 9/2005 | Everett et al. |
| 2005/0230641 A1 | 10/2005 | Chun et al. |
| 2006/0072843 A1 | 4/2006 | Johnston |
| 2006/0171647 A1 | 8/2006 | Ye et al. |
| 2006/0186235 A1 | 8/2006 | Kramer et al. |
| 2007/0154153 A1 | 7/2007 | Fomitchov et al. |
| 2008/0221388 A1 | 9/2008 | Seibel et al. |
| 2009/0316116 A1 | 12/2009 | Melville et al. |
| 2010/0289970 A1 | 11/2010 | Watanabe |
| 2011/0032602 A1 | 2/2011 | Rothenberg |
| 2011/0201941 A1 | 8/2011 | Van Gaal et al. |
| 2011/0240607 A1* | 10/2011 | Stecker ................ H01J 37/304 219/121.17 |
| 2011/0274435 A1 | 11/2011 | Fini et al. |
| 2012/0075534 A1 | 3/2012 | Katz et al. |
| 2012/0113092 A1 | 5/2012 | Bar-Zeev et al. |
| 2012/0218172 A1 | 8/2012 | Border et al. |
| 2013/0128230 A1 | 5/2013 | Macnamara |
| 2013/0300999 A1 | 11/2013 | DeJong et al. |
| 2014/0055844 A1 | 2/2014 | Cormier et al. |
| 2014/0132501 A1 | 5/2014 | Choi et al. |
| 2014/0140653 A1 | 5/2014 | Brown et al. |
| 2014/0177021 A1 | 6/2014 | Shimamoto |
| 2014/0184477 A1 | 7/2014 | Hino et al. |
| 2014/0192078 A1 | 7/2014 | Gilbert et al. |
| 2014/0211322 A1 | 7/2014 | Bohn et al. |
| 2014/0236022 A1 | 8/2014 | Zeng et al. |
| 2014/0306866 A1 | 10/2014 | Miller et al. |
| 2015/0009357 A1 | 1/2015 | Seibel et al. |
| 2015/0016777 A1 | 1/2015 | Abovitz et al. |
| 2015/0035880 A1 | 2/2015 | Heide et al. |
| 2015/0087257 A1 | 3/2015 | Balram |
| 2015/0168702 A1 | 6/2015 | Harris |
| 2015/0178939 A1 | 6/2015 | Bradski et al. |
| 2015/0205126 A1 | 7/2015 | Schowengerdt |
| 2015/0222884 A1 | 8/2015 | Cheng |
| 2015/0268415 A1 | 9/2015 | Schowengerdt et al. |
| 2015/0309264 A1 | 10/2015 | Abovitz et al. |
| 2015/0346495 A1 | 12/2015 | Welch et al. |
| 2016/0026253 A1 | 1/2016 | Bradski et al. |
| 2017/0038579 A1 | 2/2017 | Yeoh et al. |
| 2017/0097506 A1 | 4/2017 | Schowengerdt et al. |
| 2017/0097507 A1 | 4/2017 | Yeoh et al. |
| 2017/0208297 A1 | 7/2017 | Yeoh et al. |
| 2020/0145625 A1 | 5/2020 | Yeoh |

FOREIGN PATENT DOCUMENTS

| | | |
|---|---|---|
| EP | 0785457 A2 | 7/1997 |
| EP | 0785457 A3 | 7/1997 |
| JP | 03-198022 | 12/1989 |
| JP | 06-229825 | 2/1993 |
| JP | H05297313 | 11/1993 |
| JP | 2003-107402 | 4/2003 |
| JP | 2009-516862 | 4/2009 |
| JP | 2010-008948 | 1/2010 |
| JP | 2014-17776 | 1/2014 |
| WO | WO 03081320 | 10/2003 |
| WO | WO 20060070308 | 7/2006 |
| WO | WO 20090014525 | 1/2009 |
| WO | WO 20130188464 | 12/2013 |
| WO | WO 20140151877 | 9/2014 |
| WO | WO 20150081313 | 6/2015 |

OTHER PUBLICATIONS

Amendment After Final dated Jan. 31, 2020 for U.S. Appl. No. 15/286,215.

Examination Report for New Zealand Application No. 722904 dated Feb. 7, 2020, 2 pages.

(56) References Cited

OTHER PUBLICATIONS

Response to Office Action filed Mar. 10, 2020 for Chinese Patent Application No. 201780007235.5, no English translation, (5 pages).
Office Action dated Jan. 29, 2020 for Japanese Patent Application No. 2019-65723, including English translation, (10 pages).
Cited Ref2 for Japanese Patent Application No. 2019-65723, no English translation, (11 pages).
Office Action dated Jan. 6, 2020 for Chinese Patent Application No. 201680042281.4, including English translation, (15 pages).
Non-Final Office Action for U.S. Appl. No. 14/156,366 dated Sep. 3, 2015.
Final Office Action for U.S. Appl. No. 14/156,366 dated Apr. 1, 2016.
PCT International Search Report and Written Opinion dated May 8, 2014 for PCT Application No. PCT/US2014/011736, Applicant Magic Leap, Inc., (11 pages).
Non-Final Office Action for U.S. Appl. No. 14/611,162 dated Dec. 7, 2016.
Response to Non-Final Office Action for U.S. Appl. No. 14/611,162, filed Apr. 7, 2017.
Final Office Action for U.S. Appl. No. 14/611,162 dated Jul. 24, 2017.
Response to Final Office Action U.S. Appl. No. 14/611,162, filed Sep. 22, 2017.
PCT International Search Report and Written Opinion for International Application No. PCT/US15/13998, Applicant Magic Leap, Inc., dated May 1, 2015 (9 pages).
Notice of Allowance for U.S. Appl. No. 14/677,931 dated Feb. 12, 2016.
PCT International Search Report and Written Opinon for International Application No. PCT/US2016/043001, Applicant Magic Leap, Inc., dated Sep. 22, 2016 (9 pages).
PCT International Search Report and Written Opinion for International Application No. PCT/US2016/055823, Applicant Magic Leap, Inc., dated Dec. 20, 2016 (9 pages).
PCT International Search Report and Written Opinion for International Application No. PCT/US2016/055539, Applicant Magic Leap, Inc., dated Dec. 23, 2016 (9 pages).
PCT International Search Report and Written Opinion for International Application No. PCT/US2017/14138, Applicant Magic Leap, Inc., dated May 24, 2017 (11 pages).
Extended European Search Report for EP Application No. 15743704.7 dated Sep. 8, 2017.
Schowengerdt, B., et al., "3D Displays Using Scanning Laser Projection," Department of Mechanical Engineering, University of Washington, ISSN 0097-966XX/12/4302, dated 2012 (4 pages).
Non-Final Office Action for U.S. Appl. No. 15/410,456 dated Nov. 3, 2017.
Non-Final Office Action for U.S. Appl. No. 15/214,319 dated Oct. 11, 2017.
Non-Final Office Action for U.S. Appl. No. 15/287,637 dated Oct. 6, 2017.
Advisory Action dated Oct. 26, 2017 for U.S. Appl. No. 14/611,162.
Amendment and Response with RCE for U.S. Appl. No. 14/611,162, filed Nov. 22, 2017.
Amendment and Response to Non-Final Office Action for U.S. Appl. No. 15/287,637, filed Jan. 8, 2018.
Amendment and Response to Non-Final Office Action for U.S. Appl. No. 15/214,319, filed Jan. 11, 2018.
Response to Non-Final Office Action filed Feb. 5, 2018 for U.S. Appl. No. 15/410,456.
Non-Final Office Action dated Jan. 17, 2018 for U.S. Appl. No. 15/286,215.
Response to European Office Action for European Patent Application No. 15743704.7 dated Mar. 29, 2018.
Response to Non-Final Office Action filed Apr. 16, 2018 for U.S. Appl. No. 15/286,215.
Non-Final Office Action filed May 23, 2018 for U.S. Appl. No. 15/287,637.
Final Office Action dated Jun. 5, 2018 for U.S. Appl. No. 15/214,319.
Non Final office action dated Jun. 18, 2018 for U.S. Appl. No. 15/410,456.
Response to Final Office Action for U.S. Appl. No. 15/214,319, filed Aug. 6, 2018.
Non Final office action dated Jun. 27, 2018 for U.S. Appl. No. 14/611,162.
Response to Non-Final Office Action for U.S. Appl. No. 15/287,637, filed Aug. 23, 2018.
Office Action dated Jul. 20, 2018 for Chinese Application No. 201580017626.6, including translation provided by Chinese associate.
Non-Final Office Action dated Sep. 12, 2018 for U.S. Appl. No. 15/286,215.
Response to Non-Final Office Action for U.S. Appl. No. 15/410,456, filed Sep. 17, 2018.
Extended European Search Report for European Patent Application No. 16854353.6 dated Sep. 14, 2018.
Notice of Allowance dated Sep. 25, 2018 for U.S. Appl. No. 15/214,319.
Response to Non-Final Office Action for U.S. Appl. No. 14/611,162, filed Sep. 26, 2018.
Extended European Search Report dated Sep. 27, 2018 for EP Application No. 16854232.2.
Office Action dated Sep. 21, 2018 for Japanese Patent Application No. 2016-549347, including translation provided by Japanese associate.
Extended European Search Report dated Nov. 20, 2018 for EP Application No. 16828424.8.
Office Action Response filed Nov. 29, 2018 for Japanese Application No. 2016-549347, including Claims in English provided by Japanese associate.
Office Action response filed Dec. 3, 2018 for Chinese Application No. 201580017626.6, including claims in English.
Notice of Allowance for U.S. Appl. No. 15/214,319 dated Dec. 3, 2018.
Response to Non-Final Office Action for U.S. Appl. No. 15/286,215, filed Nov. 30, 2018.
Extended European Search Report dated Dec. 19, 2018 for European Patent Application No. 17741926.4.
Notice of Allowance dated Jan. 24, 2019 for U.S. Appl. No. 14/611,162.
Final office Action dated Jan. 28, 2019 for U.S. Appl. No. 15/410,456.
Notice of Allowance dated Mar. 5, 2019 for Japanese Patent Application No. 2016-549347.
Notice of Allowance dated Jan. 25, 2019 for U.S. Appl. No. 15/287,637.
Non-Final Office Action dated Mar. 22, 2019 for U.S. Appl. No. 15/286,215.
Response to Final Office Action for U.S. Appl. No. 15/410,456, filed Mar. 27, 2019.
Response to Extended European Search Report for European Patent Application No. 16854353.6 filed Apr. 2, 2019.
Notice of Allowance dated May 6, 2019 for Chinese Patent Application No. 201580017626.6, No English Translation.
First Examination Report dated May 3, 2019 for Australian Patent Application No. 2015210708.
Response to Extended European Search Report for European Patent Application No. 16828424.8 filed Jun. 13, 2019.
Response to Extended European Search Report for European Patent Application No. 17741926.4 filed Jul. 17, 2019.
Response to Non-Final Office Action filed Jul. 18, 2019 for U.S. Appl. No. 15/286,215.
Advisory Action dated May 15, 2019 for U.S. Appl. No. 15/410,456.
Response to Final Office Action filed Jul. 26, 2019 for U.S. Appl. No. 15/410,456.
Examination Report for European Application No. 15743704.7 dated Aug. 1, 2019, 6 pages.
Notice of Allowance dated Oct. 9, 2019 for U.S. Appl. No. 15/410,456.
Final Office Action dated Nov. 1, 2019 for U.S. Appl. No. 15/286,215.
Response to Examination Report for European Application No. 15743704.7 filed Dec. 10, 2019, 10 pages.
Response to Examination Report for Australian Application No. 2015210708 filed Dec. 11, 2019, 18 pages.

(56) References Cited

OTHER PUBLICATIONS

Office Action dated Oct. 31, 2019 for Chinese Patent Application No. 201780007235.5, including English translation, (12 pages).
Office Action dated Feb. 6, 2020 for Korean Patent Application No. 10-2016-7023727, (2 pages).
Foreign Office Action for Indian Patent Appln. No. 201647026959 dated Apr. 23, 2020.
Extended European Search Report and Written Opinion for EP Patent Appln. No. 20156688.2 dated Apr. 29, 2020.
Foreign Office Action for New Zealand Patent Appln. No. 722904 dated May 8, 2020.
Foreign Office Action for Chinese Patent Appln. No. 201680057391.8 dated Mar. 10, 2020.
Non-Final Office Action for U.S. Appl. No. 15/286,215 dated Apr. 3, 2020.
Foreign Office Action for Chinese Patent Appln. No. 201680042281.4 dated May 21, 2020 (no translation available).
Foreign Office Action for Chinese Patent Appln. No. 201680057392.2 dated Apr. 14, 2020.
Amendment Response to NFOA for U.S. Appl. No. 15/286,215 dated Jun. 26, 2020.
Extended European Search Report for EP Patent Appln. No. 20173220.3 dated Jun. 18, 2020.
Foreign Office Action for Chinese Patent Appln. No. 201680057391.8 dated Jul. 17, 2020.
Foreign Office Action for Chinese Patent Appln. No. 201780007235.5 dated Jul. 14, 2020.
Foreign Office Action Response for Chinese Patent Appln. No. 201680057392.2 dated Aug. 28, 2020 (no translation available).
1st Examination Report for EP Patent Appln. No. 16854353.6 dated Aug. 28, 2020.
Foreign Notice of Allowance for CA Patent Appln. No. 2938262 dated Aug. 5, 2020.
Second Office Action for CN Patent Appln. No. 201680042281.4 dated Aug. 4, 2020.
Amendment Response to FOA for U.S. Appl. No. 16/391,577 dated Sep. 21, 2020.
Foreign OA Response for CN Patent Appln. No. 201780007235.5 dated Sep. 23, 2020.
Foreign OA Response for JP Patent Appln. No. 2018-502353 dated Sep. 24, 2020.
Non-Final Office Action for U.S. Appl. No. 16/373,227 dated Jul. 7, 2020.
Amendment Response to NFOA for U.S. Appl. No. 16/373,227, filed Oct. 7, 2020.
Notice of Allowance for U.S. Appl. No. 15/286,215 dated Oct. 7, 2020.
Notice of Allowance for U.S. Appl. No. 16/391,577 dated Oct. 7, 2020.
Foreign Notice of Allowance for JP Patent Appln. No. 2018-502353 dated Oct. 9, 2020.
Foreign OA Response for CN Patent Appln. No. 201680042281.4 dated Oct. 19, 2020.
Foreign Exam Report for AU Patent Appln. No. 2016336546 dated Sep. 21, 2020.
Foreign OA for IL Patent Appln. No. 260064 dated Sep. 21, 2020.
Foreign OA for JP Patent Appln. No. 2018-517428 dated Sep. 29, 2020.
Foreign OA for JP Patent Appln. No. 2018-517279 dated Oct. 2, 2020.
Peng Y. et al., Large Vibration Fiber Scanner with two spring constants, 2011 Proceedings of JSPE Semestrial Meeting, Japan, Sep. 5, 2011, pp. 990-991 (a document showing a well-known technique).
1st Examination Report for AU Patent Appln. No. 2017209171 dated Oct. 20, 2020.
Foreign OA Response for IN Patent Appln. No. 201647026959 dated Oct. 21, 2020.
1st Patent Exam Report for NZ Patent Appln. No. 741832 dated Nov. 9, 2020.
Foreign OA for CN Patent Appln. No. 201680057392.2 dated Oct. 19, 2020.
Foreign OA for CN Patent Application No. 201680057391.8 dated Nov. 2, 2020.
Foreign Rejection Deciscion for CN Patent Appln. No. 201780007235.5 dated Nov. 13, 2020.
Foreign OA for JP Patent Application No. 2018-537615 dated Nov. 27, 2020.
Foreign OA Response for JP Patent Application No. 2019-65723 dated Dec. 16, 2020.
Foreign Exam Report for AU Patent Appln. No. 2016333970 dated Dec. 17, 2020.
Foreign OA Response for JP Patent Appln. No. 2018-517279 dated Dec. 22, 2020.
Foreign Response for IL Patent Appln. No. 246995 dated Sep. 24, 2020.
Foreign Response for AU Patent Application No. 2019280001 dated Dec. 23, 2020.
Foreign Response for CN Patent Appln. No. 201680057392.2 dated Dec. 25, 2020.
Foreign Response for JP Patent Appln. No. 2018-517428 dated Dec. 24, 2020.
Foreign Response for CN Patent Appln. No. 201680057391.8 dated Jan. 5, 2021.
Foreign OA Response for IL Patent Appln. No. 260064 dated Jan. 13, 2021.
Notice of Allowance for U.S. Appl. No. 15/286,215 dated Jan. 21, 2021.
Foreign Exam Report for IN Patent Appln. No. 201847014197 dated Jan. 21, 2021.
Foreign Response for AU Patent Appln. No. 2016296723 dated Jan. 21, 2021.
Foreign Notice of Allowance for IL Patent Appln. No. 260064 dated Jan. 20, 2021.
Foreign Response for NZ Patent Appln. No. 739170 dated Feb. 3, 2021.
Foreign Exam Report for NZ Patent Appln. No. 739170 dated Feb. 9, 2021.
Foreign Response for CN Patent Appln. No. 201780007235.5 dated Feb. 25, 2021.
Foreign Response for JP Patent Appln. No. 2018-537615 dated Feb. 24, 2021.
Foreign Exam Report for IN Patent Appln. No. 201847000653 dated Feb. 26, 2021.
Foreign Exam Report for IN Patent Appln. No. 201847031358 dated Feb. 15, 2021.
Foreign Response for IN Patent Appln. No. 201847031358 dated Feb. 23, 2021.
Foreign OA for CN Patent Appln. No. 201680057392.2 dated Feb. 3, 2021.
Foreign NOA for CN Patent Appln. No. 201680042281.4 dated Mar. 2, 2021.
Foreign Response for EP Patent Appln. No. 20173220.3 dated Mar. 19, 2021.
Foreign Exam Report for NZ Patent Appln. No. 741830 dated Feb. 24, 2021.
Foreign Response for CN Patent Appln. No. 201680057392.2 dated Apr. 16, 2021.
Foreign OA for CN Patent Appln. No. 201910654692.4 dated Feb. 24, 2021.
Foreign NOA for IL Patent Appln. No. 246996 dated Feb. 17, 2021.
Foreign Response for NZ Patent Appln. No. 741832 dated May 4, 2021.
Foreign NOA for CN Patent Appln. No. 201780007235.5 dated Apr. 7, 2021.
Foreign OA for CN Patent Appln. No. 201680057391.8 dated Apr. 14, 2021.
Foreign NOA for JP Patent Appln. No. 2019-65723 dated May 25, 2021.
Foreign OA for JP Patent Appln. No. 2018-517279 dated May 7, 2021.
Foreign FOA for JP Patent Appln. No. 2018-517428 dated May 7, 2021.

(56) References Cited

OTHER PUBLICATIONS

Foreign NOA for JP Patent Appln. No. 2018-537615 dated Jun. 1, 2021.
Extended European Search Report for EP Patent Appln. No. 21150452.7 dated Apr. 1, 2021.
Foreign OA for IL Patent Appln. No. 257984 dated May 19, 2021.
Foreign Exam Report for IN Patent Appln. No. 201847014316 dated Jun. 21, 2021.
Foreign Exam Report for NZ Patent Appln. No. 741832 dated May 24, 2021.
Foreign OA for IL Patent Appln. No. 258059 dated Jun. 10, 2021.
Foreign Response for CN Patent Appln. No. 201680057391.8 dated Jun. 29, 2021.
Foreign Exam Report for EP Patent Appln. No. 20173220.3 dated Jun. 16, 2021.
Foreign Response for AU Patent Appln. No. 2016333970 dated Jun. 29, 2021.
Foreign OA for CN Patent Appln. No. 201680057392.2 dated Apr. 30, 2021.
Foreign Response for CN Patent Appln. No. 201910654692.4 dated Jul. 12, 2021.
Foreign Response for CN Patent Appln. No. 201680057392.2 dated Jul. 15, 2021.
Foreign Exam Report for IL Patent Appln. No. 256838 dated Apr. 7, 2021.
Foreign Exam Report for NZ Patent Appln. No. 775329 dated May 31, 2021.
Foreign Response for IN Patent Appln. No. 201847014197 dated Jul. 21, 2021.
Foreign Response for JP Patent Appln. No. 2018-517279 dated Aug. 6, 2021.
Foreign Response for NZ Patent Appln. No. 741830 dated Aug. 23, 2021.
Foreign Notice of Acceptance for AU Patent Appln. No. 2016333970 dated Aug. 5, 2021.
Foreign Response for AU Patent Appln. No. 2016336546 dated Aug. 25, 2021.
Foreign Exam Report for CA Patent Appln. No. 2991642 dated Jul. 27, 2021.
Foreign Response for IN Patent Appln. No. 201847000653 dated Aug. 23, 2021.
Foreign Notice of Appeal for JP Patent Appln. No. 2018-517428 dated Sep. 6, 2021.
Foreign Rejection Decision for CN Patent Appln. No. 201680057391.8 dated Aug. 6, 2021.
Foreign Rejection Decision for CN Patent Appln. No. 201680057392.2 dated Aug. 4, 2021.
Foreign Response for AU Patent Appln. No. 2017209171 dated Sep. 22, 2021.
Foreign Response for IL Patent Appln. No. 257984 dated Sep. 18, 2021.
Foreign Response for EP Patent Appln. No. 20173220.3 dated Oct. 22, 2021 [ML-0222EPDIV1].
Foreign OA for IL Patent Appln. No. 282078 dated Oct. 6, 2021.
Foreign OA for JP Patent Appln. No. 2020-185787 dated Oct. 18, 2021.
Foreign OA for KR Patent Appln. No. 10-2018-7004846 dated Nov. 10, 2021.
Foreign Response for CN Patent Appln. No. 201680057392.2 dated Nov. 19, 2021.
Foreign Response for CN Patent Appln. No. 201680057391.8 dated Nov. 23, 2021.
Foreign Response for EP Patent Appln. No. 21150452.7 dated Nov. 23, 2021.
Foreign Response for CA Patent Appln. No. 2991642 dated Nov. 22, 2021.
Foreign Response for NZ Patent Appln. No. 775329 dated Nov. 30, 2021.
Foreign NOA for NZ Patent Appln. No. 741832 dated Nov. 9, 2021.
Foreign NOA for CA Patent Appln. No. 2976955 dated Nov. 15, 2021.
Foreign Response for NZ Patent Appln. No. 741830 dated Dec. 15, 2021.
Foreign NOA for CN Patent Appln. No. 201910654692.4 dated Dec. 15, 2021.
Foreign Response for IN Patent Appln. No. 201847014316 dated Dec. 28, 2021.
Foreign NOA for IL Patent Appln. No. 283164 dated Nov. 22, 2021.
Foreign Response for JP Patent Appln. No. 2020-185787 dated Jan. 6, 2022.
Foreign NOA for CA Patent Appln. No. 2991642 dated Dec. 29, 2021.
Foreign Exam Report for CA Patent Appln. No. 2998029 dated Dec. 7, 2021.
Foreign Response for KR Patent Appln. No. 10-2018-7004846 dated Jan. 7, 2022.
Foreign Exam Report for CA Patent Appln. No. 2998030 dated Dec. 16, 2021.
Foreign OA for CN Patent Appln. No. 201680057392.2 dated Jan. 10, 2022.
Foreign OA for KR Patent Appln. No. 10-2018-7012947 dated Jan. 13, 2022.
Foreign OA for KR Patent Appln. No. 10-2018-7012934 dated Jan. 17, 2022.
Foreign OA for JP Patent Appln. No. 2018-517279 dated Jan. 5, 2022.
Foreign NOA for KR Patent Appln. No. 10-2018-7004846 dated Jan. 20, 2022.
Foreign Response for IL Patent Appln. No. 282078 dated Feb. 1, 2022.
Foreign Response for IL Patent Appln. No. 258059 dated Feb. 3, 2022.
Foreign NOA for JP Patent Appln. No. 2020-185787 dated Feb. 14, 2022.
Foreign Notice of Acceptance for NZ Patent Appln. No. 741830 dated Feb. 24, 2022.
Foreign Exam Report for AU Patent Appln. No. 2021282549 dated Feb. 23, 2022.

\* cited by examiner

POLARIZING MAINTAINING OPTICAL FIBER IN VIRTUAL/AUGMENTED REALITY SYSTEM

CROSS-REFERENCE TO RELATED APPLICATION(S)

This application is a continuation of pending U.S. application Ser. No. 15/410,456, entitled "POLARIZING MAINTAINING OPTICAL FIBER IN VIRTUAL/AUGMENTED REALITY SYSTEM," filed Jan. 19, 2017, under attorney docket number ML-ML.20056.00, which claims priority from U.S. Provisional Patent Application Ser. No. 62/280,992 entitled "POLARIZING MAINTAINING OPTICAL FIBER IN VIRTUAL/AUGMENTED REALITY SYSTEM," filed on Jan. 20, 2016 under attorney docket number ML.30056.00. The content of the aforementioned patent applications are hereby expressly and fully incorporated by reference in their entirety, as though set forth in full.

FIELD OF THE INVENTION

The present invention generally relates to systems and methods configured to facilitate interactive virtual or augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display subsystem, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display subsystem to view directly the light from real objects in the environment. The transparent element, often referred to as a "combiner," superimposes light from the display over the end user's view of the real world.

VR and AR systems typically employ a display subsystem having a projection subsystem and a display surface positioned in front of the end user's field of view and on which the projection subsystem sequentially projects image frames. In true three-dimensional systems, the depth of the display surface can be controlled at frame rates or sub-frame rates. The projection subsystem may include one or more optical fibers into which light from one or more light sources emit light of different colors in defined patterns, and a scanning device that scans the optical fiber(s) in a predetermined pattern to create the image frames that sequentially displayed to the end user.

In a typical head-worn VR/AR system, it is desirable to design the display subsystem to be a light-weight as possible to maximize comfort to the user. To this end, various components of the VR/AR system may be physically contained in a distributed system that includes the display subsystem itself, and a control subsystem locatable remotely from the user's head. For example, the control subsystem may be contained in a belt-pack medallion that can be affixed to the waist of the user. Because it is desirable to locate the light source(s) remotely from the head of the user (e.g., in the belt-pack medallion) due to weight, heat, and form factor considerations, the light source(s) must be located with the control subsystem away from the display.

As such, the optical fiber(s) must be routed from the remote light source(s) to the portion of the display subsystem located on the head of the user. For example, referring to FIG. 2, a single-mode optical fiber 20 is used for performing both transmission and scanning functions by propagating the light from the remote light source(s) 22 (transmission function) to the scanning device 24, where it is manipulated thereby to scan light in a predetermined scanning pattern (scanning function).

To prevent color distortion of the image displayed to the user (after the polarized laser light is propagated through the diffractive optics of the display, which is highly polarization sensitive), the polarization of the light injected into the optical fiber(s) from the light source(s) must be maintained through the entirety of the optical fiber(s). In an ordinary optical fiber, two polarization modes (e.g., vertical and horizontal polarization) have the same nominal phase velocity due to the circular symmetry of the fiber. However, tiny amounts of random birefringence in such a fiber, or bending in the fiber, will cause a tiny amount of crosstalk from the vertical to the horizontal polarization mode. And since even a short portion of fiber, over which a tiny coupling coefficient may apply, is many thousands of wavelengths long, even that small coupling between the two polarization modes, applied coherently, can lead to a large power transfer to the horizontal mode, completely changing the wave's net state of polarization. Since that coupling coefficient was unintended and a result of arbitrary stress or bending applied to the fiber, the output state of polarization will itself be random, and will vary as those stresses or bends vary.

Thus, due to the tortuous path that the optical fiber(s) must be routed between the remote light source(s) and the head-mounted display subsystem (which may be quite long when it spans the human neck and torso), the optical fiber(s) may be bent differently (due to user bodily motion, etc.) and thus strained, thereby drastically changing the polarization of the light traveling through the optical fiber(s).

It is known to use a polarization-maintaining optical fiber (PM fiber), which is a single-mode optical fiber in which linearly polarized light, if properly launched into the fiber, maintains a linear polarization during propagation, exiting the fiber in a specific linear polarization state. PM fibers maintain linear polarization during propagation by intentionally introducing a systematic linear birefringence in the fiber, so that there are two well-defined polarization modes that propagate along the fiber with very distinct phase velocities. Several different PM fiber designs can be used to create birefringence in a fiber. For example, the fiber may be geometrically asymmetric or have a refractive index profile that is asymmetric, such as the design using an elliptical cladding, a design using rods of another material within the cladding, or a design using structured-core fibers (e.g., photonic bandgap fibers) to permanently induce stress in the fiber.

Although projection subsystems can be designed with PM fibers in mind, pre-existing scanning devices are designed to operate with non-PM fibers, which exhibit different mechanical properties than do PM fibers. In this case, the scanning device will not operate in the same manner when the non-PM fiber(s) are substituted with the polarization maintaining optical fiber(s). In particular, a PM fiber with highly asymmetrical bending stiffness will have very different dynamics than a non-PM fiber with symmetrical bending stiffness. Consequently, the PM fiber would not achieve a resonant spiral scan, which is the default scanning mode for the display device. Furthermore, the distal ends of the optical fiber(s) are typically tapered to increase operating frequency and thus better resolution, thereby resulting in better performance. However, in the case where the PM fibers utilize stress inducing elements, these additional elements will affect the scanning field of the scanning device. As such, a scanning device would have to be redesigned to accommodate the alternative use of PM fibers, which would result in additional cost to the VR/AR system.

There, thus, is a need for a low cost solution that maintains linear polarization in an optical fiber connected between a remote light source and a head-mounted display subsystem without having to redesign a scanning device in the display subsystem.

SUMMARY

Embodiments of the present invention are directed to devices, systems and methods for facilitating virtual reality and/or augmented reality interaction for one or more users.

In accordance with a first aspect of the present inventions, a display subsystem for a virtual image generation system for use by an end user comprises a display (e.g., a planar waveguide apparatus). In one embodiment, the display may be configured for being positioned in front of the eyes of the end user. In this case, the display may have a partially transparent display surface configured for being positioned in the field of view between the eyes of the end user and an ambient environment.

The display subsystem further comprises an optical fiber having a polarization-maintaining (PM) transmission fiber section and a non-PM scanning fiber section. In one embodiment, the transmission fiber section comprises a cladding having a circularly asymmetrical cross-section. In another embodiment, the transmission fiber section comprises a circularly symmetrical cladding, and at least one additional element configured for inducing a strain in the cladding.

The display subsystem further comprises a light source configured for injecting a linearly polarized light beam into the transmission fiber section, such that the linearly polarized light beam is emitted from the scanning fiber section, a mechanical scanning drive assembly in which the scanning fiber section is affixed, wherein the mechanical scanning drive assembly is configured for displacing the scanning optical fiber section is order to scan the emitted light beam, and a display configured for receiving the scanned light beam and generating an image to the end user. In one embodiment, the proximal end of the scanning fiber section is entirely affixed within the mechanical scanning drive assembly. In another embodiment, the mechanical scanning drive assembly may comprise a piezoelectric element in which the scanning fiber section is mounted.

In one embodiment, the mechanical scanning drive assembly and the display are integrated into a head-worn unit, and the light source is contained in a remote control unit configured for being worn by end user remotely from the head-worn unit. The control unit may be, e.g., worn on the torso or waist of the end user. The scanning fiber section may be routed between the remote control unit and the head-worn unit.

In accordance with a second aspect of the present invention, a virtual image generation system for use by an end user, comprises memory storing a three-dimensional scene, a control subsystem (e.g., one comprising a graphics processing unit (GPU)) configured for rendering a plurality of synthetic image frames of the three-dimensional scene, and the display subsystem set forth above. The display subsystem is configured for sequentially displaying the plurality of image frames to the end user.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

The description that follows relates to display subsystems and methods to be used in virtual reality and/or augmented reality systems. However, it is to be understood that the while the invention lends itself well to applications in virtual or augmented reality systems, the invention, in its broadest aspects, may not be so limited.

Figure 3:
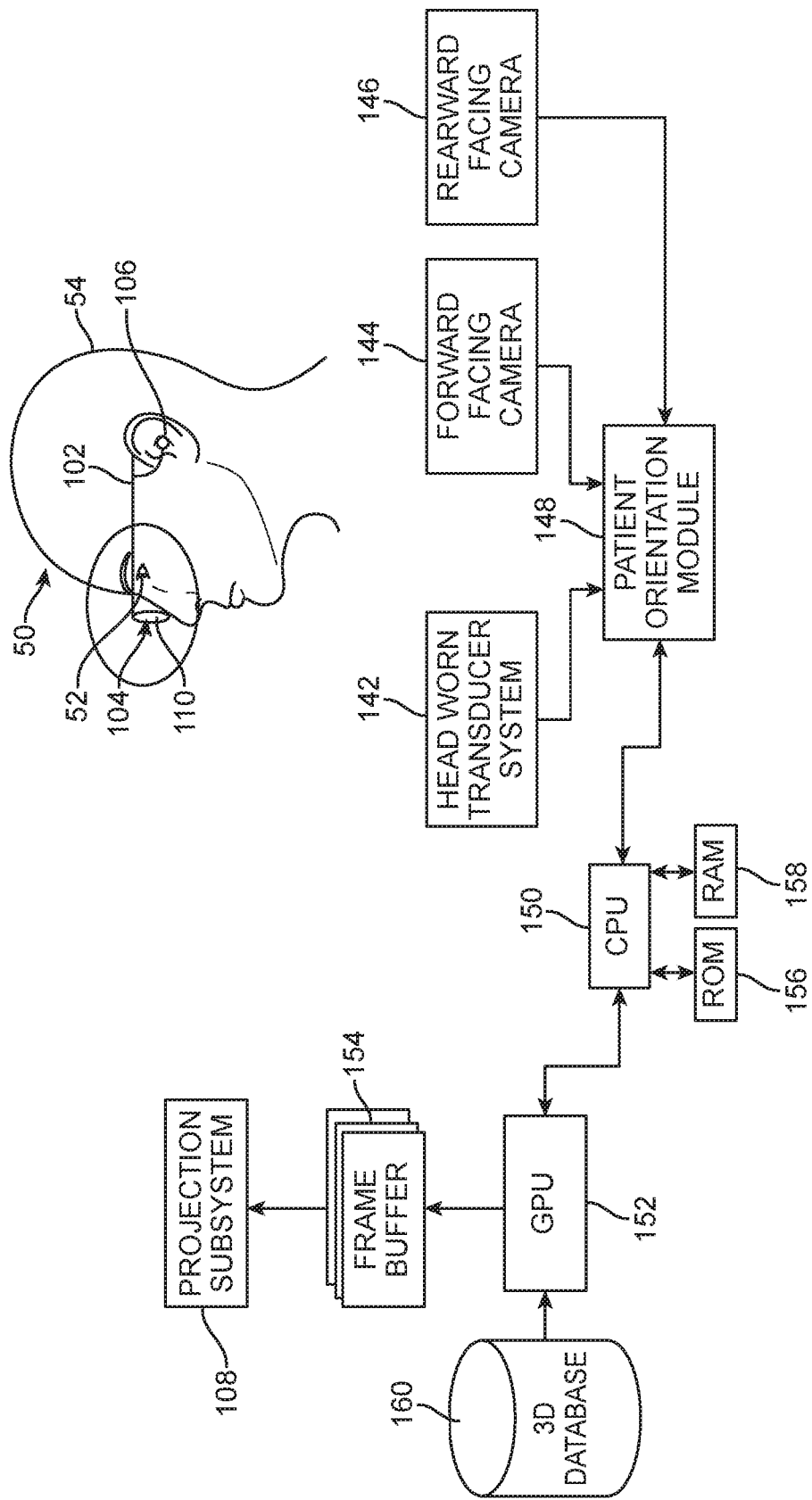
FIG. 3 is a block diagram of a virtual image generation system constructed in accordance with one embodiment of the present inventions.

Referring to FIG. 3, one embodiment of a virtual image generation system 100 constructed in accordance with present inventions will now be described. The virtual image generation system 100 may be operated as an augmented reality subsystem, providing images of virtual objects intermixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and on to which the virtual image generation system 100 produces images of virtual objects.

The virtual image generation system 100, and the various techniques taught herein, may be employed in applications other than augmented reality and virtual reality subsystems. For example, various techniques may be applied to any projection or display subsystem, or may be applied to pico projectors where movement may be made by an end user's hand rather than the head. Thus, while often described herein in terms of an augmented reality subsystem or virtual reality subsystem, the teachings should not be limited to such subsystems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alpha-numeric object, a virtual tag object, a virtual field object, a virtual chart object, a virtual map object, a virtual instrumentation object, or a virtual visual representation of a physical object.

To this end, the virtual image generation system 100 comprises a frame structure 102 worn by an end user 50, a display subsystem 104, at least a portion of which is carried by the frame structure 102, such that the display subsystem 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 104 presents a sequence of synthetic image frames at high frequency that provides the perception of a single coherent scene.

The display subsystem 104 comprises a projection subsystem 108 and a partially transparent display screen 110 on which the projection subsystem 108 projects images. The display screen 110 is positioned in the end user's 50 field of view between the eyes 52 of the end user 50 and an ambient environment.

In the illustrated embodiment, the projection subsystem 108 takes the form of an optical fiber scan-based projection device, and the display screen 110 takes the form of a waveguide-based display into which the scanned light from the projection subsystem 108 is injected to produce, e.g., images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 104 may be monocular or binocular.

Figure 4:
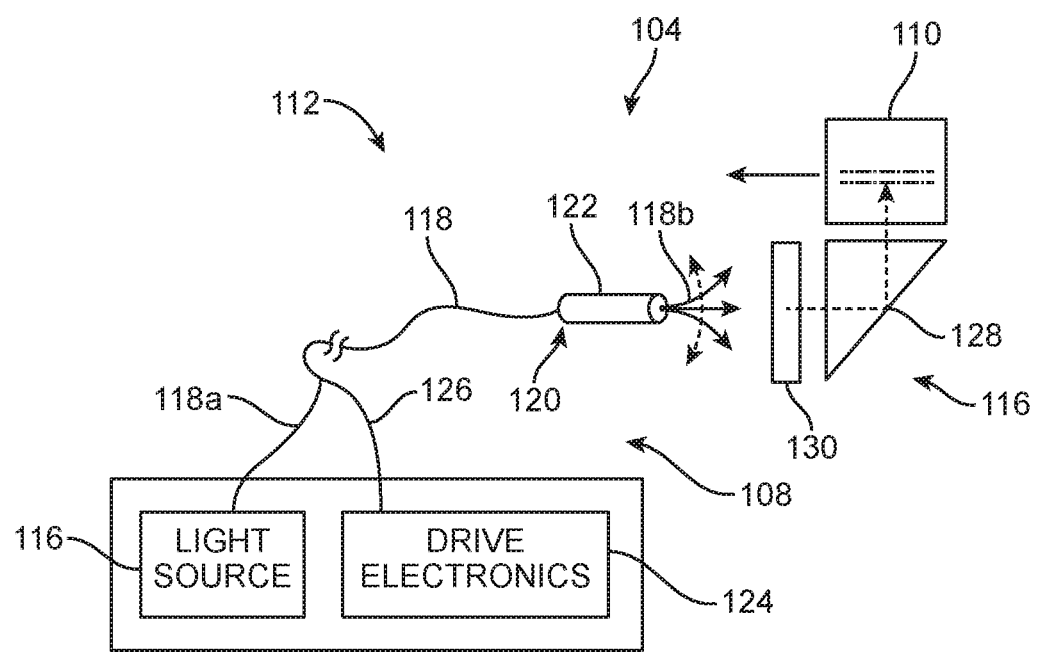
FIG. 4 is a plan view of one embodiment of a display subsystem for use in the virtual image generation system of FIG. 3.
Figure 5:
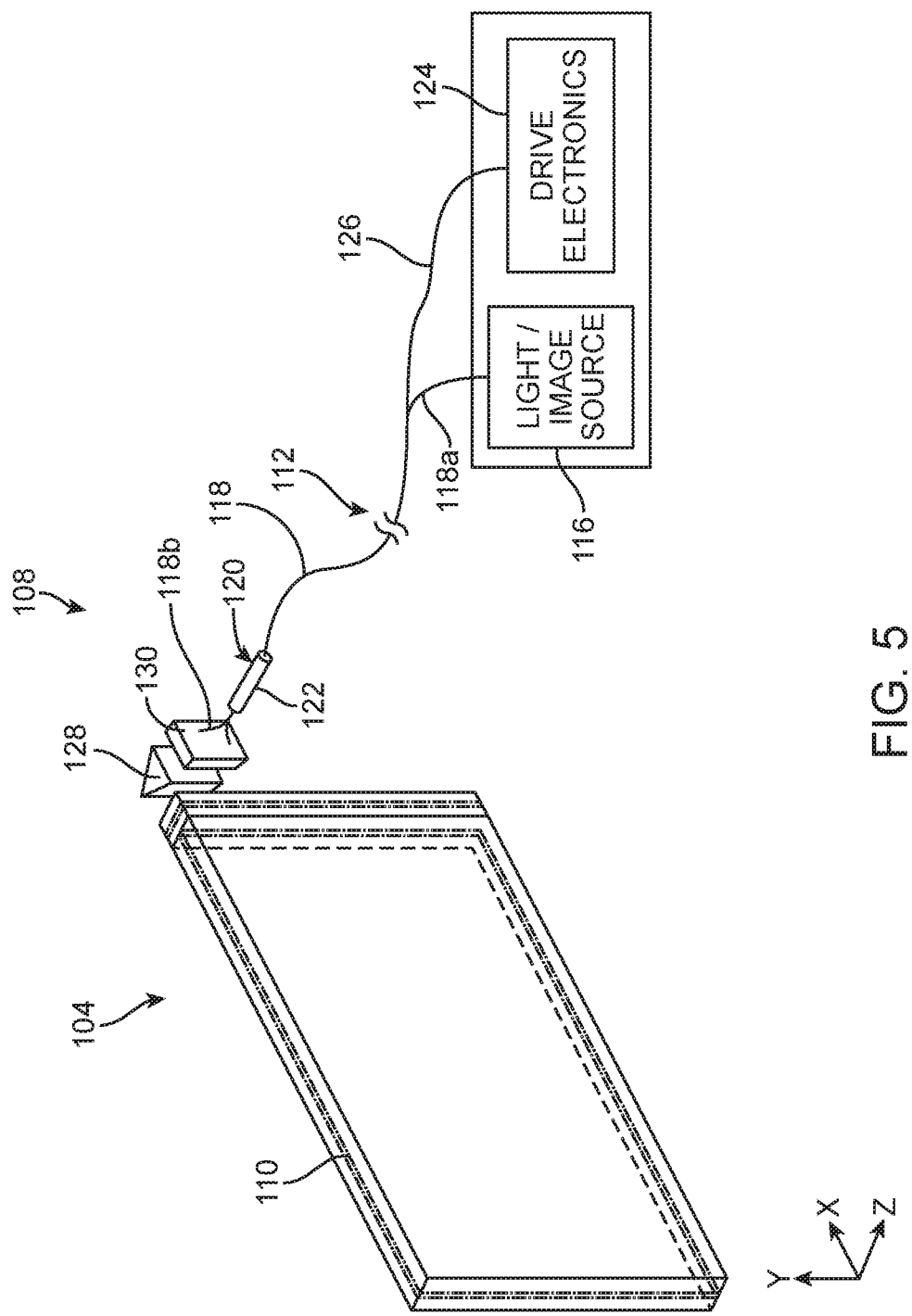
FIG. 5 is perspective view of one embodiment of a display subsystem for use in the virtual image generation system of FIG. 3.

Referring to FIGS. 4 and 5, the projection subsystem 108 includes a scanning assembly 112 that generates and scans a light beam in a predetermined scan pattern in response to control signals, and an optical coupling subsystem 114 that couples the light beam from the scanning assembly 114 into the display screen 110.

The scanning assembly 112 comprises one or more light sources 116 (only one shown for purposes of simplicity) that produces the light beam (e.g., emits light of different colors in defined patterns). The light source 116 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient.

The scanning assembly 112 further comprises one or more optical fibers 118 (only one shown for purposes of simplicity), each of which has a proximal end 118a into which a light beam is received from the light source 116 and a distal end 118b from which the light beam is provided to the partially transparent display screen 110. The scanning assembly 112 further comprises a mechanical drive assembly 120 to which the optical fiber 118 is mounted. The drive assembly 120 is configured for displacing the distal end 118b of the optical fiber 118, and in the illustrated embodiment, comprises a piezoelectric element 122 to which the optical fiber 118 is mounted.

The scanning assembly 112 further comprises drive electronics 124 configured for conveying electrical signals to the piezoelectric element 122, thereby causing the distal ends 118b of the optical fiber 118 to vibrate in accordance with the scan pattern. Thus, operation of the light source 116 and drive electronics 124 are coordinated in a manner that generates image data that is encoded in the form of light that is spatially and/or temporally varying.

In the illustrated embodiment, the piezoelectric element 122 takes the form of a hollow tube, in which case, the distal end 118b of the optical fiber 118 is threaded or received through the piezoelectric tube 122. The distal end 118b of the optical fiber 118 protrudes from the piezoelectric tube 122 as a fixed-free flexible cantilever. The piezoelectric tube 122 is associated with four quadrant electrodes (not illustrated). The electrodes may, for example, be plated on the outside, outer surface or outer periphery or diameter of the piezoelectric tube 122. A core electrode (not illustrated) is also located in a core, center, inner periphery or inner diameter of the tube 122.

The drive electronics 124 are electrical coupled via wires 126 to drive opposing pairs of electrodes (not shown) to bend the piezoelectric tube 122 in two axes independently. The protruding distal end 118b of the optical fiber 118 has mechanical modes of resonance. The frequencies of resonance depend upon a diameter, length, and material properties of the optical fiber 118. By vibrating the piezoelectric tube 122 near a first mode of mechanical resonance, the fiber distal end 118b is caused to vibrate, and can sweep through large deflections about a fulcrum. Alternatively, the piezoelectric tube 122 may be vibrated near a higher order mode (e.g., second order mode) of mechanical resonance, such that the fiber distal end 118b sweeps through smaller deflections about a fulcrum.

By stimulating resonant vibration in two axes, the fiber distal end 118 is scanned biaxially in an area filling 2D scan. By modulating an intensity of the light source 116 in synchrony with the scan of the fiber distal end 118b, a light beam emerging from the optical fiber 118 forms an image. Descriptions of such a set up are provided in U.S. patent application Ser. No. 13/915,530, entitled "Multiple Depth Plane Three-Dimensional Display Using A Wave Guide Reflector Array Projector," which is expressly incorporated herein by reference.

The optical coupling subsystem 116 includes an optical waveguide input apparatus 128, for instance, one or more reflective surfaces, diffraction gratings, mirrors, dichroic mirrors, or prisms to optically couple light into the end of the display screen 110. The optical coupling subsystem 116 further includes a collimation element 130 that collimates light from the optical fiber 118. Optionally, the optical coupling subsystem 116 comprises an optical modulation apparatus (not shown) configured for converging the light from the collimation element 130 towards a focal point in the center of the optical waveguide input apparatus 128, thereby allowing the size of the optical waveguide input apparatus 128 to be minimized, as discussed in further details in U.S. Provisional Patent Application Ser. No. 62/277,865, entitled "Virtual/Augmented Reality System Having Reverse Angle Diffraction Grating," which is expressly incorporated herein by reference.

Figure 6:
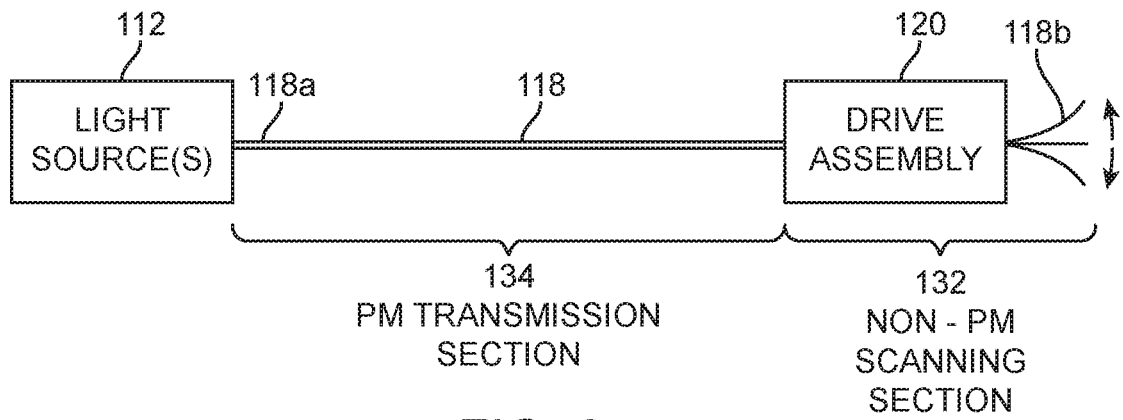
FIG. 6 is a plan view of a composite optical fiber used to optically couple a light source to a scanning device in the display subsystem of the virtual image generation system of FIG. 3.

Referring now to FIG. 6, each of the optical fibers 118 combines the advantages of polarization-maintaining (PM) optical fibers with those of non-PM optical fibers to ensure that the linearly polarization of the light beam propagating through the respective optical fiber 118 is maintained, while maintaining the mechanical properties of the portion of the optical fiber 118 associated with the scanning device 114. To this end, the optical fiber 118 comprises a non-PM fiber scanning section 132 and a PM transmission fiber section 134. Each of the transmission fiber section 132 and the scanning fiber section 134 conventionally includes a transparent core and a transparent cladding material surrounding the core and having a lower index of refraction that keeps light in the core via the phenomenon of total internal reflection, thereby causing the fiber to act as a waveguide.

Figure 7A:
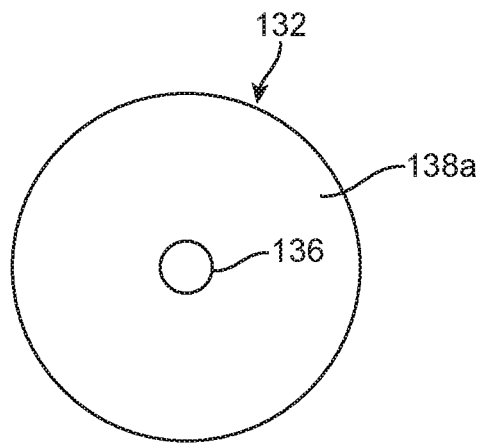
FIG. 7a is a cross-sectional view of one embodiment of a non-polarization-maintaining scanning fiber section of the composite optical fiber of FIG. 6.
Figure 7B:
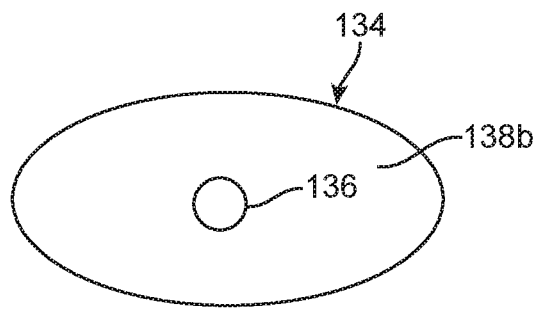
FIG. 7b is a cross-sectional view of one embodiment of a polarization-maintaining transmission fiber section of the composite optical fiber of FIG. 6.
Figure 7C:
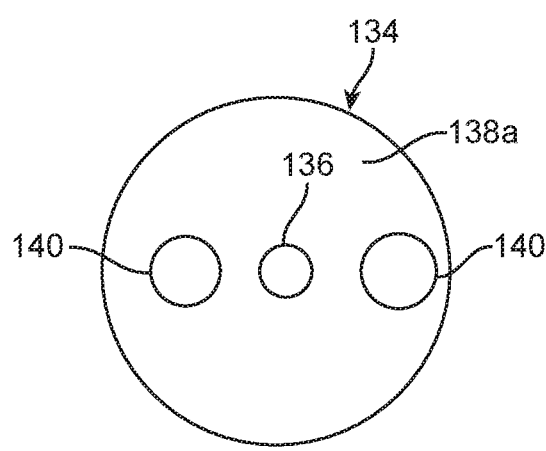
FIG. 7c is a cross-sectional view of one embodiment of the fiber section of the composite optical fiber of FIG. 6.

In the illustrated embodiment, the scanning fiber section 132 comprises a transparent core 136 and a cylindrical cladding 138a surrounding the transparent core 136. The cladding 138a has a circularly symmetrical refractive index, such that light beam propagates through the scanning fiber section 132 without maintaining the linear polarization of the light beam in the presence of external stresses (see FIG. 7a). In one embodiment, the transmission fiber section 134 is similar to the scanning fiber section 132, with the exception that the transmission fiber section 134 comprises a cladding 138b having a geometrically asymmetrical cross-section (e.g., in this case, elliptical) or otherwise has a circularly asymmetrical refractive index to induce birefringence in the fiber, thereby maintaining the linearly polarization of the propagating light beam even in the presence of external stress (see FIG. 7b). In another embodiment, the transmission fiber section 134 is similar to the scanning fiber section 132, with the exception that the transmission fiber section 134 further comprises additional elements 140 composed of a different material than the cladding 138a, thereby permanently inducing stress in the fiber (see FIG. 7c).

In the illustrated embodiment, the scanning fiber section 132 is relatively short and is affixed within the scanning device 114, whereas the transmission fiber section 134 is relatively long and is routed from the respective light source 112 to the scanning device 114. As such, the transmission fiber section 134 is optically coupled to the respective light source 112, and the scanning fiber section 132 is coupled to the drive assembly 120 of the scanning device 112. The scanning fiber section 132 and transmission fiber section 134 are spliced together in any suitable manner that minimizes cladding laser transmission modes.

Because the scanning fiber section 132 is affixed within, e.g., the piezoelectric tube 122 of the scanning device 114, stress on the scanning fiber section 132 is prevented, thereby maintaining the linear polarization of the light beam propagating through the scanning fiber section 132. By the same token, linear polarization of the light beam propagating through the transmission fiber section 134 is maintained despite the bending forces applied to the transmission fiber section 134.

Figure 8:
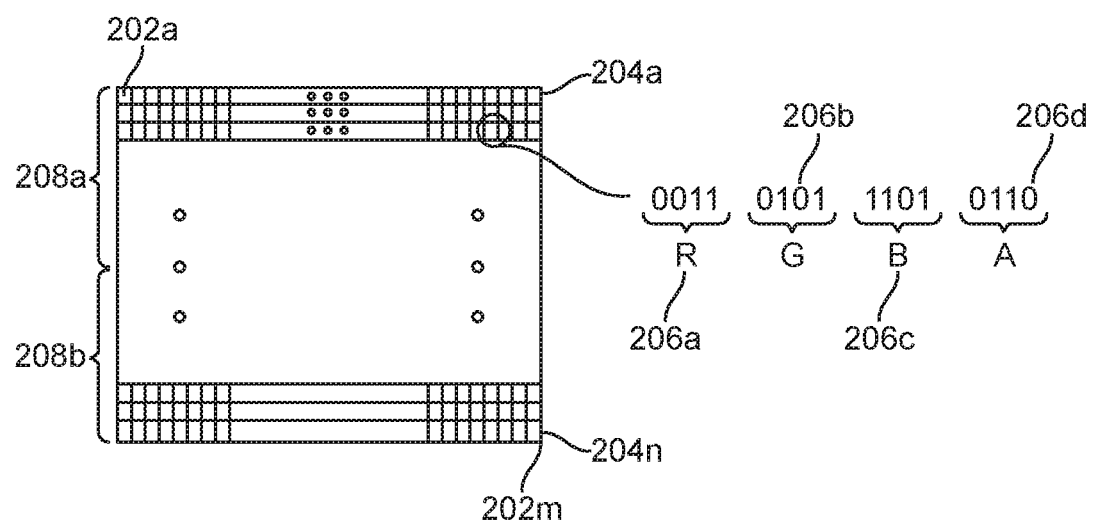
FIG. 8 is a plan view of an exemplary frame generated by the virtual image generation system of FIG. 3.

Thus, the display subsystem 104 generates a series of synthetic image frames of pixel information that present an undistorted image of one or more virtual objects to the user. For example, referring to FIG. 8, a synthetic image frame 200 is schematically illustrated with cells 202a-202m divided into horizontal rows or lines 204a-204n. Each cell 202 of the frame 200 may specify values for each of a plurality of colors for the respective pixel to which the cell 202 corresponds and/or intensities. For instance, the frame 200 may specify one or more values for red 206a, one or more values for green 206b, and one or more values for blue 206c for each pixel. The values 206 may be specified as binary representations for each of the colors, for instance, a respective 4-bit number for each color. Each cell 202 of the frame 200 may additionally include a value 206d that specifies an amplitude.

The frame 200 may include one or more fields, collectively 208. The frame 200 may consist of a single field. Alternatively, the frame 200 may comprise two, or even more fields 208a-208b. The pixel information for a complete first field 208a of the frame 200 may be specified before the pixel information for the complete second field 208b, for example occurring before the pixel information for the second field 208b in an array, an ordered list or other data structure (e.g., record, linked list). A third or even a fourth field may follow the second field 208b, assuming a presentation subsystem is configured to handle more than two fields 208a-208b.

Further details describing display subsystems are provided in U.S. patent application Ser. No. 14/212,961, entitled "Display Subsystem and Method," and U.S. patent application Ser. No. 14/696,347, entitled "Primary Waveguide Apparatus With Diffraction Element(s) and Subsystem Employing Same," which are expressly incorporated herein by reference.

Figure 1:
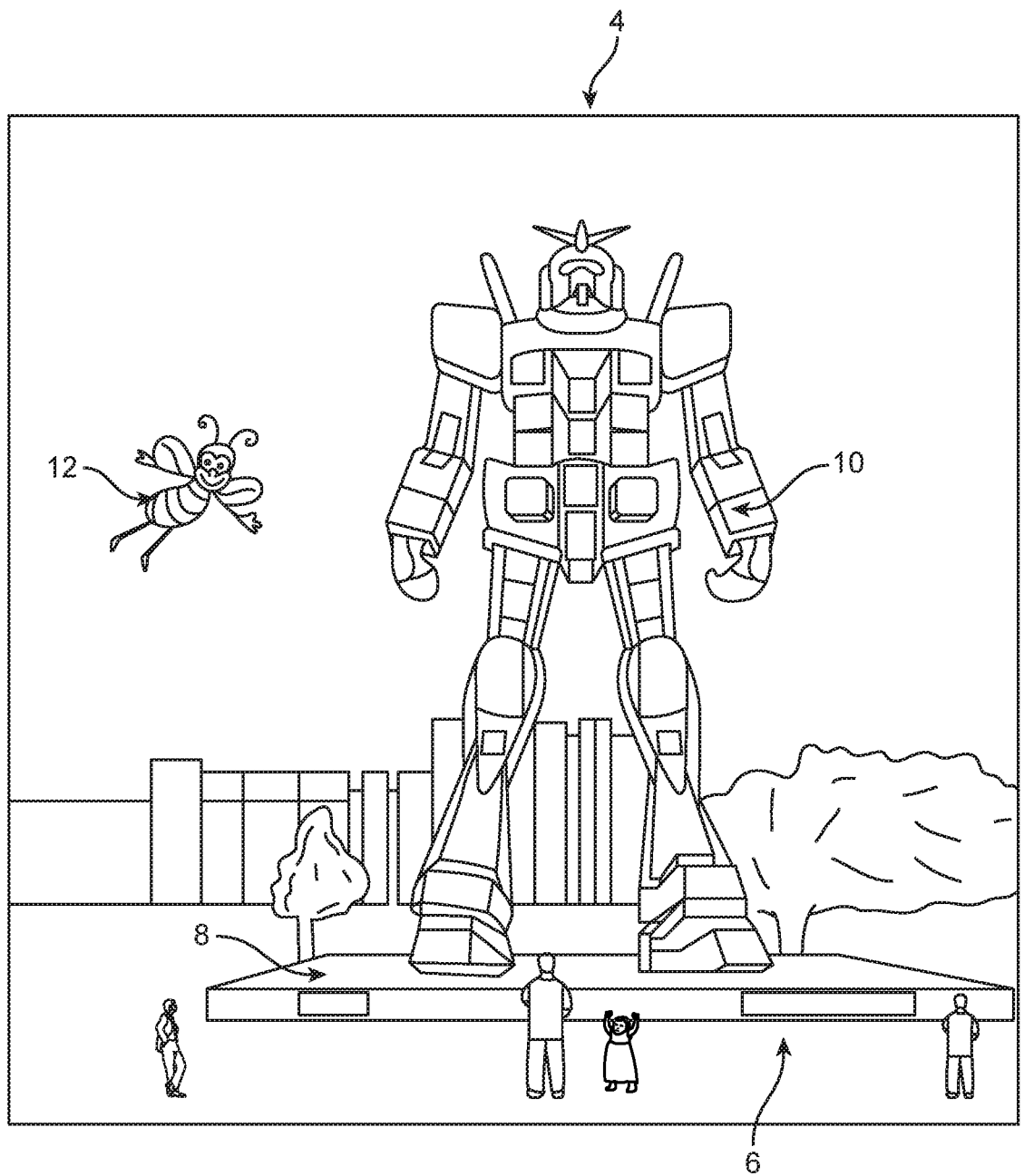
FIG. 1 is a picture of a three-dimensional augmented reality scene that can be displayed to an end user by a prior art augmented reality generation device.
Figure 2:
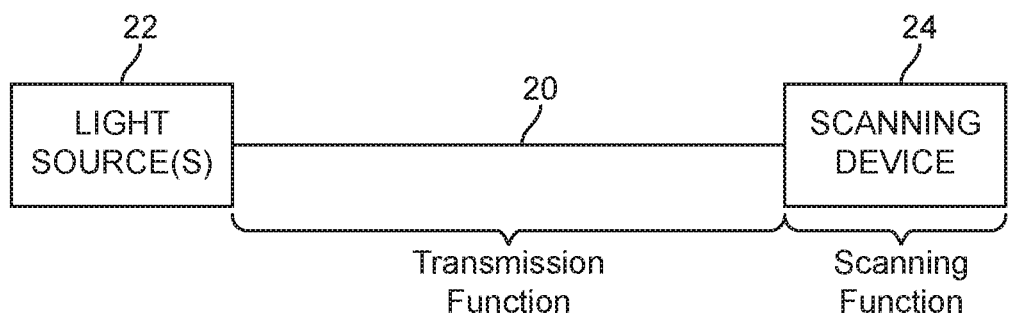
FIG. 2 is a plan view of a prior art single-mode optical fiber used to optically couple a light source to a scanning device.

Referring back to FIG. 2, the virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

For example, in one embodiment, the virtual image generation system 100 comprises a head worn transducer subsystem 142 that includes one or more inertial transducers to capture inertial measures indicative of movement of the head 54 of the end user 50. Such may be used to sense, measure, or collect information about the head movements of the end user 50. For instance, such may be used to detect measurement movements, speeds, acceleration, and/or positions of the head 54 of the end user 50.

The virtual image generation system 100 further comprises one or more forward facing cameras 144, which may be used to capture information about the environment in which the end user 50 is located. The forward facing camera(s) 144 may be used to capture information indicative of distance and orientation of the end user 50 with respect to that environment and specific objects in that environment. When head worn, the forward facing camera(s) 144 is particularly suited to capture information indicative of distance and orientation of the head 54 of the end user 50 with respect to the environment in which the end user 50 is located and specific objects in that environment. The forward facing camera(s) 144 may, for example, be employed to detect head movement, speed, and/or acceleration of head movements. The forward facing camera(s) 144 may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50).

The virtual image generation system 100 further comprises a pair of rearward facing cameras 146 to track movement, blinking, and depth of focus of the eyes 52 of the end user 50. Such eye tracking information may, for example, be discerned by projecting light at the end user's eyes, and detecting the return or reflection of at least some of that projected light. Further details discussing eye tracking devices are provided in U.S. patent application Ser. No. 14/212,961, entitled "Display System and Method," U.S. patent application Ser. No. 14/726,429, entitled "Methods and Subsystem for Creating Focal Planes in Virtual and Augmented Reality," and U.S. patent application Ser. No. 14/205,126, entitled "System and Method for Augmented and Virtual Reality," which are expressly incorporated herein by reference.

The virtual image generation system 100 further comprises a user orientation detection module 148. The user orientation module 148 detects the instantaneous position of the head 54 of the end user 50 and may predict the position of the head 54 of the end user 50 based on position data received from the sensor(s). The user orientation module 148 also tracks the eyes 52 of the end user 50 based on the tracking data received from the sensor(s).

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the virtual image generation system 100 comprises a central processing unit (CPU) 150, a graphics processing unit (GPU) 152, and one or more frame buffers 154. The CPU 150 controls overall operation, while the GPU 152 renders frames (i.e., translating a three-dimensional scene into a two-dimensional image) and stores these frames in the frame buffer(s) 154. While not illustrated, one or more additional integrated circuits may control the reading into and/or reading out of frames from the frame buffer(s) 154 and operation of the scanning device of the display subsystem 104. Reading into and/or out of the frame buffer(s) 154 may employ dynamic addressing, for instance, where frames are over-rendered. The virtual image generation system 100 further comprises a read only memory (ROM) 156 and a random access memory (RAM) 158. The virtual image generation system 100 further comprises a three-dimensional data base 160 from which the GPU 152 can access three-dimensional data of one or more scenes for rendering frames.

Figure 9A:
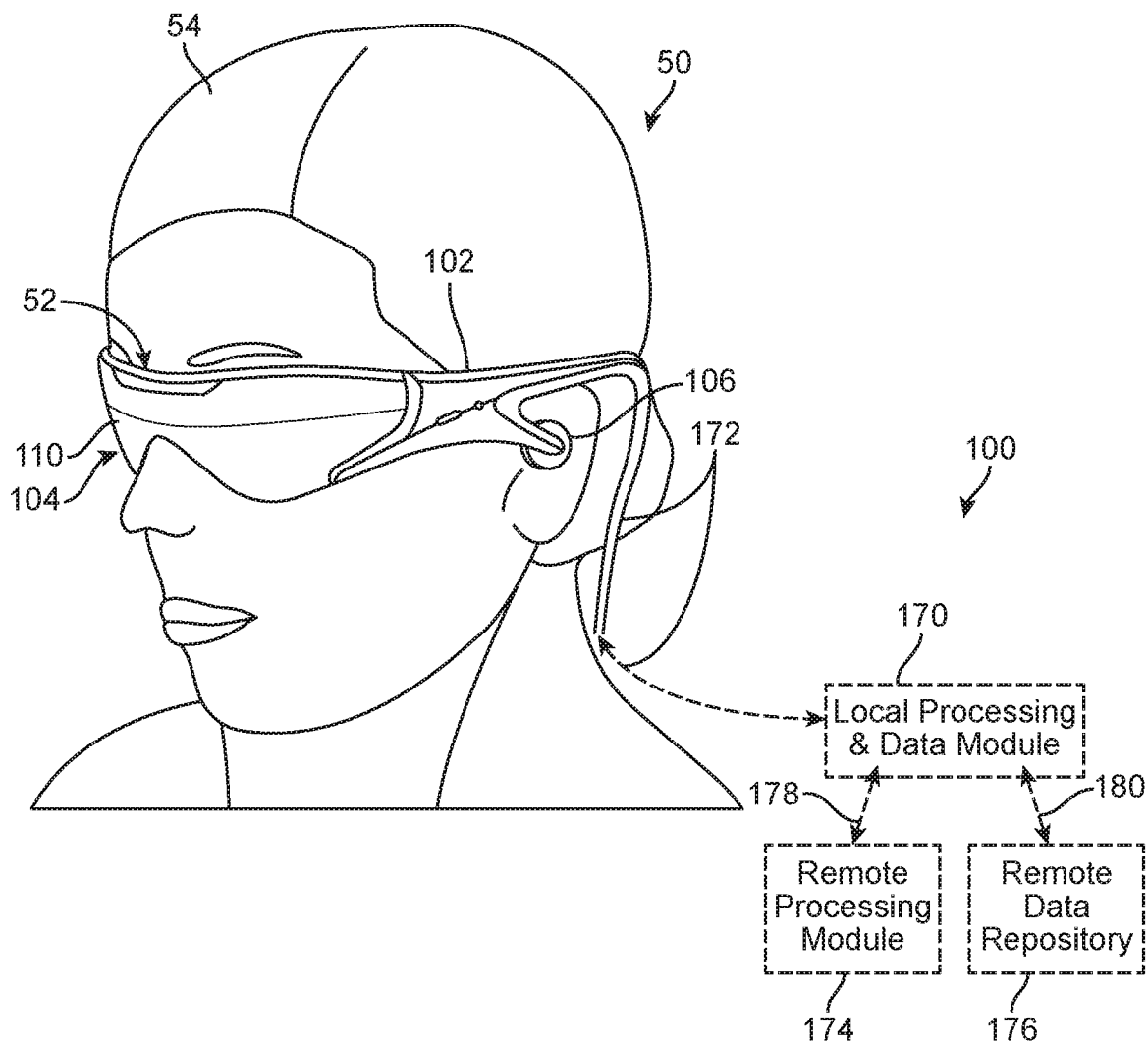
FIG. 9a is a plan view of one technique that can be used to wear the virtual image generation system of FIG. 3.
Figure 9B:
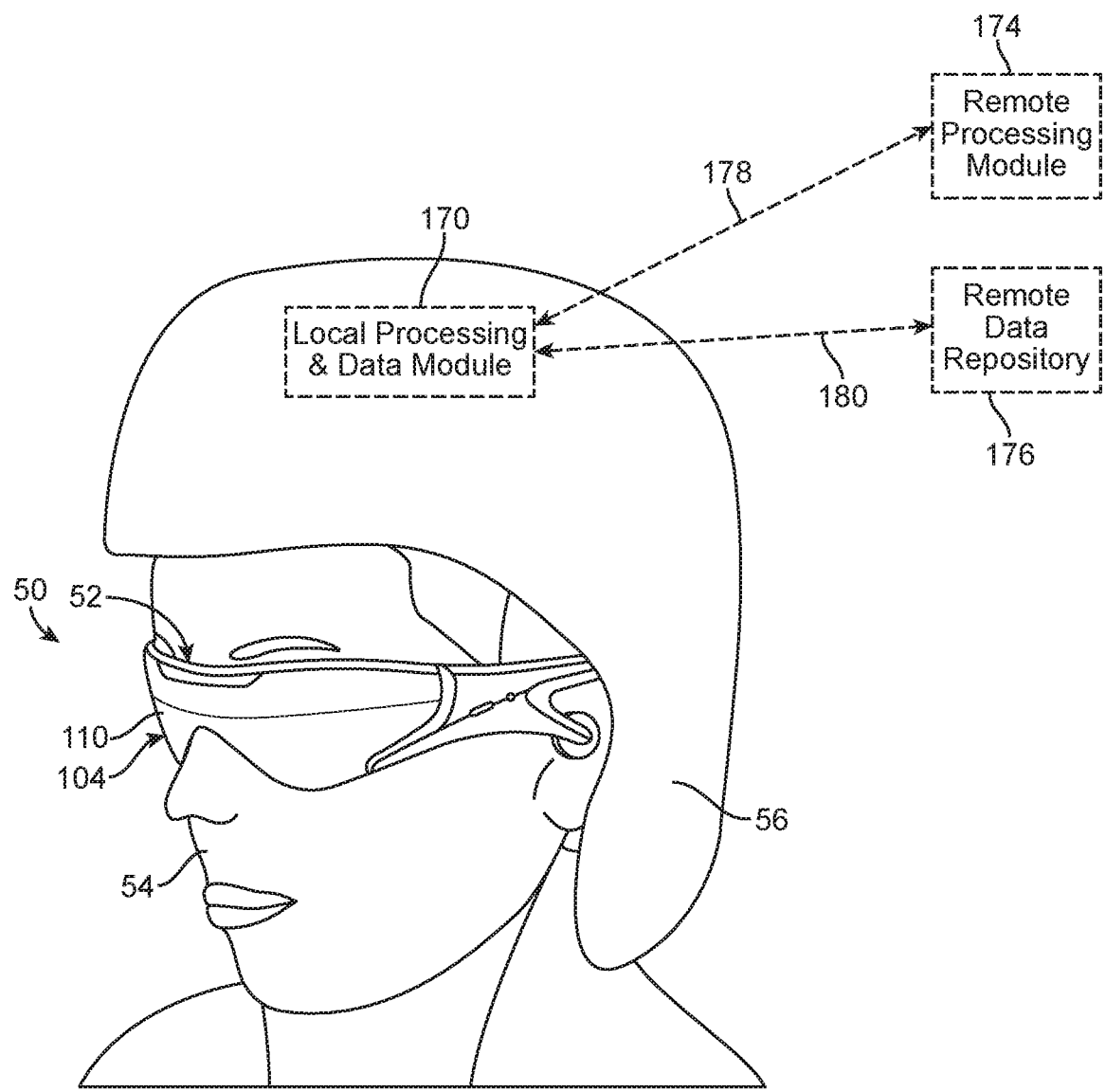
FIG. 9b is a plan view of another technique that can be used to wear the virtual image generation system of FIG. 3.
Figure 9C:
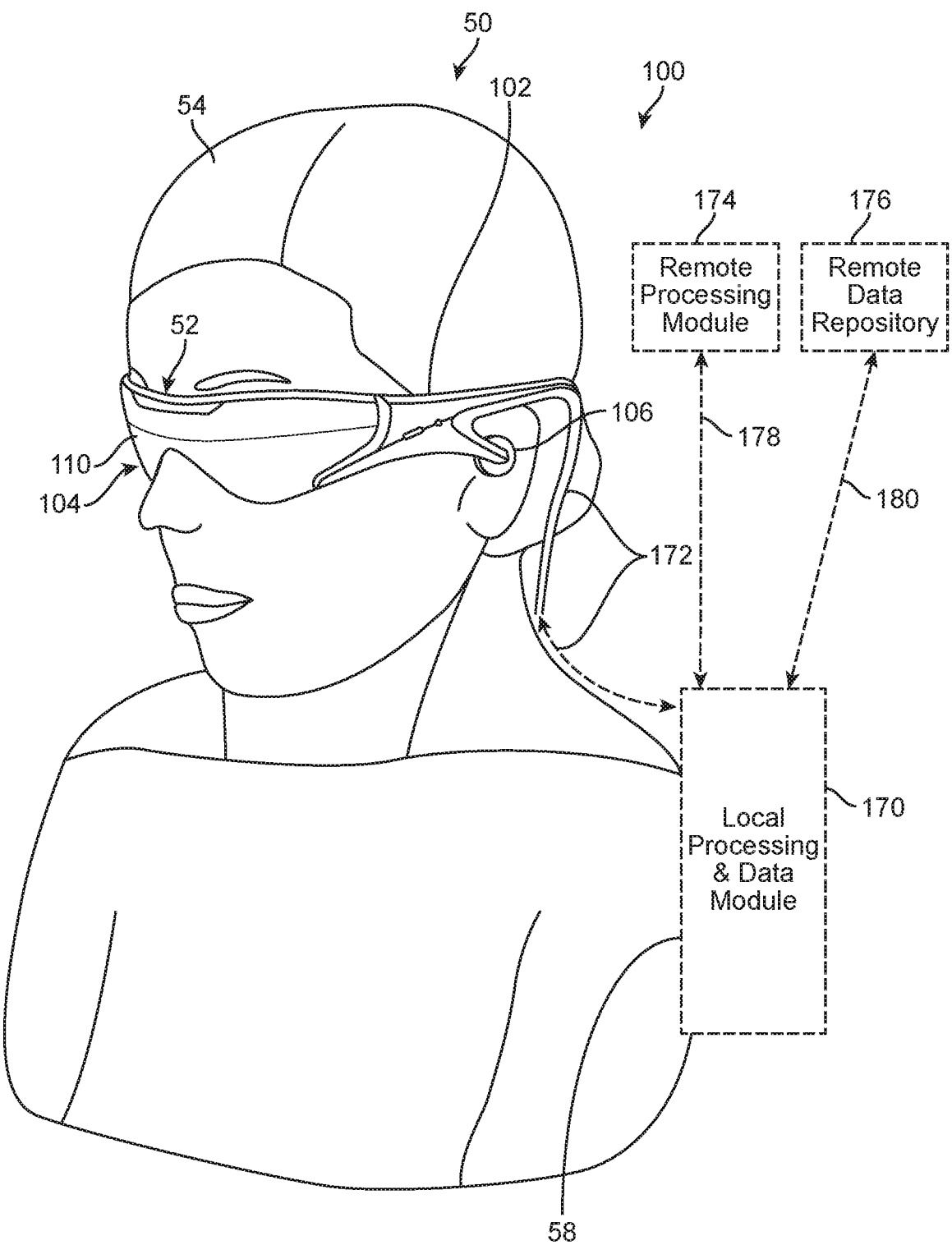
FIG. 9c is a plan view of still another technique that can be used to wear the virtual image generation system of FIG. 3.
Figure 9D:
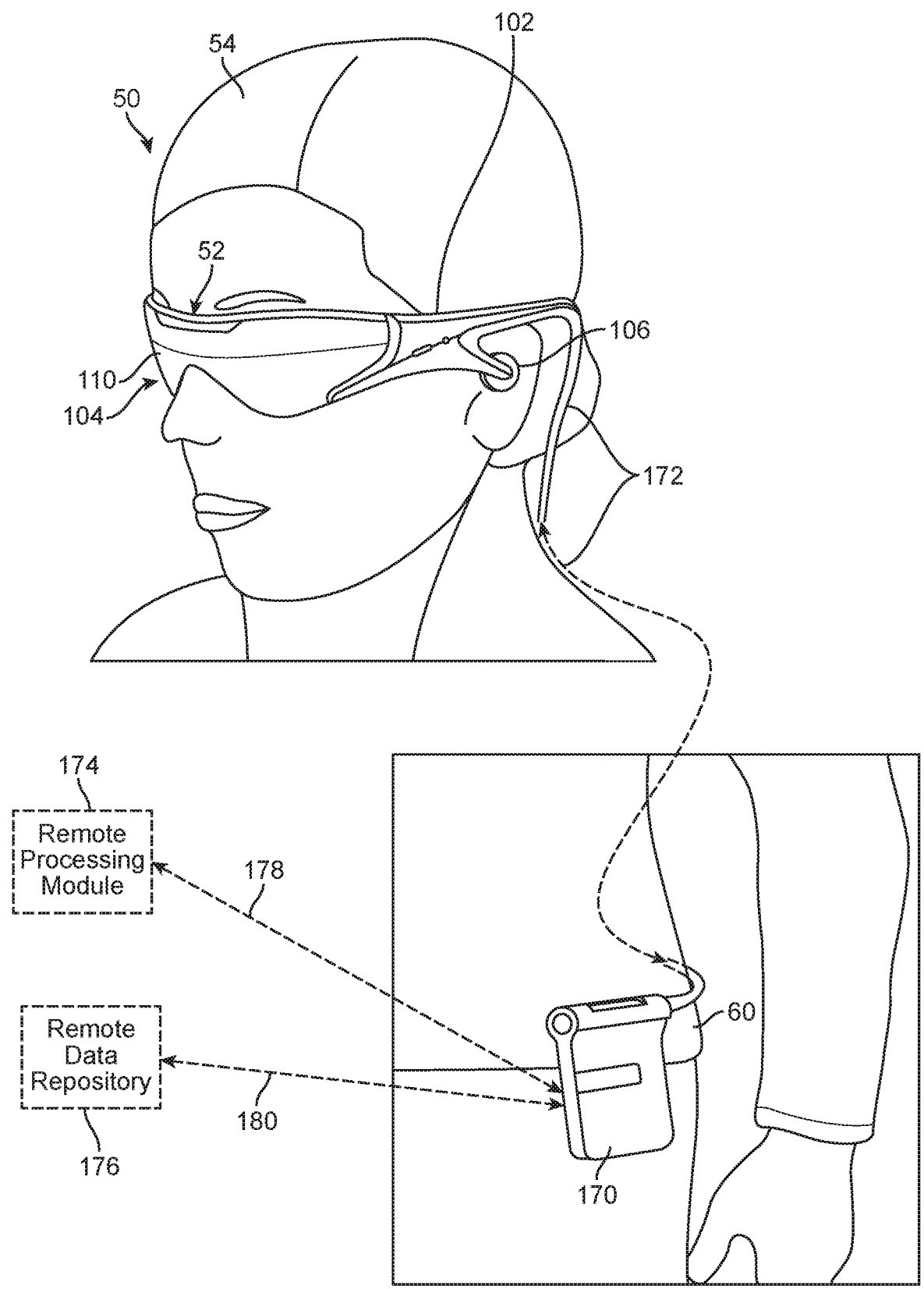
FIG. 9d is a plan view of yet another technique that can be used to wear the virtual image generation system of FIG. 3.

The various processing components of the virtual image generation system 100 may be physically contained in a distributed subsystem. For example, as illustrated in FIG. 9a-9d, the virtual image generation system 100 comprises a local processing and data module 170 operatively coupled, such as by a wired lead or wireless connectivity 172, to a portion of the display subsystem 104 (including the display screen 110 and mechanical drive assembly 120) and sensors. The light source(s) 116 and drive electronics 124 are contained in the local processing and data module 170, in which case, the connectivity 172 will include the optical fiber(s) 118. The local processing and data module 172 may be mounted in a variety of configurations, such as fixedly attached to the frame structure 102 (FIG. 9a), fixedly attached to a helmet or hat 56 (FIG. 9b), embedded in headphones, removably attached to the torso 58 of the end user 50 (FIG. 9c), or removably attached to the hip 60 of the end user 50 in a belt-coupling style configuration (FIG. 9d). The virtual image generation system 100 further comprises a remote processing module 174 and remote data repository 176 operatively coupled, such as by a wired lead or wireless connectivity 178, 180, to the local processing and data module 170, such that these remote modules 174, 176 are operatively coupled to each other and available as resources to the local processing and data module 170.

The local processing and data module 170 may comprise a power-efficient processor or controller, as well as digital memory, such as flash memory, both of which may be utilized to assist in the processing, caching, and storage of data captured from the sensors and/or acquired and/or processed using the remote processing module 174 and/or remote data repository 176, possibly for passage to the display subsystem 104 after such processing or retrieval. The remote processing module 174 may comprise one or more relatively powerful processors or controllers configured to analyze and process data and/or image information. The remote data repository 176 may comprise a relatively large-scale digital data storage facility, which may be available through the internet or other networking configuration in a "cloud" resource configuration. In one embodiment, all data is stored and all computation is performed in the local processing and data module 170, allowing fully autonomous use from any remote modules.

The couplings 172, 178, 180 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s) 118. In still further implementations, the choice of wired and wireless communications may be different from that illustrated in FIGS. 9a-9d. Thus, the particular choice of wired or wireless communications should not be considered limiting.

In the illustrated embodiment, the light source(s) 116 and drive electronics 124 of the display subsystem 104 are contained in the local processing and data module 170, in which case, the connectivity 172 will include the optical fiber(s) 118 for connecting these components to the mechanical drive assembly 120 located in close association with the display screen 110). The user orientation module 148 is contained in the local processing and data module 170, while the CPU 150 and GPU 152 are contained in the remote processing module 174, although in alternative embodiments, the CPU 150, GPU 152, or portions thereof may be contained in the local processing and data module 170. The three dimensional database 160 can be associated with the remote data repository 176.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications, and equivalents, which may be included within the spirit and scope of the present inventions as defined by the claims.

What is claimed is:

1. A virtual image generation system, comprising:
a composite optical fiber that is a composite of a polarization-maintaining (PM) transmission fiber section and a non-PM scanning fiber section that is spliced to the PM transmission fiber section;
a light source configured for injecting a linearly polarized light beam into the PM transmission fiber section, such that the linearly polarized light beam is emitted from the non-PM scanning fiber section;
a mechanical scanning drive assembly to which the non-PM scanning fiber section is affixed, wherein the non-PM scanning fiber section is spliced to the PM transmission fiber section within the mechanical scanning drive assembly, and wherein the mechanical scanning drive assembly is configured for displacing the non-PM scanning fiber section to scan the emitted light beam; and
a display subsystem configured for receiving a scanned light beam and, based on the scanned light beam, displaying an image,
wherein the non-PM scanning fiber section comprises a transparent core and a cylindrical cladding surrounding the transparent core, and
wherein the cylindrical cladding has a circularly symmetrical refractive index.

2. The system of claim 1, wherein the display subsystem comprises a planar waveguide apparatus.

3. The system of claim 1, wherein the PM transmission fiber section comprises a cladding having a circularly asymmetrical cross-section.

4. The system of claim 1, wherein the PM transmission fiber section comprises a circularly symmetrical cladding, and at least one additional element configured for inducing a strain in the cladding.

5. The system of claim 1, wherein the mechanical drive assembly and the display subsystem is integrated into a head-worn unit, and the light source is contained in a remote control unit configured for being worn by end user remotely from the head-worn unit.

6. The system of claim 5, wherein the control unit is configured for being worn on the torso of the end user.

7. The system of claim 5, wherein the control unit is configured for being worn on the waist of the end user.

8. The system of claim 5, wherein the PM transmission fiber section is routed between the remote control unit and the head-worn unit.

9. The system of claim 1, wherein a proximal end of the non-PM scanning fiber section is entirely affixed within the mechanical scanning drive assembly.

10. The system of claim 1, wherein the mechanical scanning drive assembly comprises a piezoelectric element in which the non-PM scanning fiber section is mounted.

11. The system of claim 1, wherein the display subsystem is configured for being positioned in front of the eyes of the end user.

12. The system of claim 11, wherein the display subsystem has a partially transparent display subsystem surface configured for being positioned in the field of view between the eyes of the end user and an ambient environment.

13. The system of claim 1, further comprising a frame structure configured for being worn by the end user, the frame structure carrying the display subsystem.

14. The system of claim 1, wherein the PM transmission fiber section comprises a transparent core and a cladding surrounding the transparent core, and
wherein the cladding has a circularly asymmetrical refractive index.

15. The system of any of claim 1, wherein the PM transmission fiber section comprises a transparent core, an additional element, and a cladding surrounding the transparent core and the additional element.

16. The system of claim 1, further comprising:
a memory storing a three-dimensional scene; and
a control subsystem configured for rendering a plurality of synthetic image frames of the three-dimensional scene,
wherein the display subsystem is configured for sequentially displaying the plurality of image frames to the end user.

17. The system of claim 16, wherein the control subsystem comprises a graphics processing unit (GPU).

* * * * *